3,405,685
TIP RESISTANT ANIMAL FEEDER
John W. Harrell, P.O. Box 1416, Dade City, Fla. 33525
Filed Oct. 6, 1966, Ser. No. 584,776
5 Claims. (Cl. 119—61)

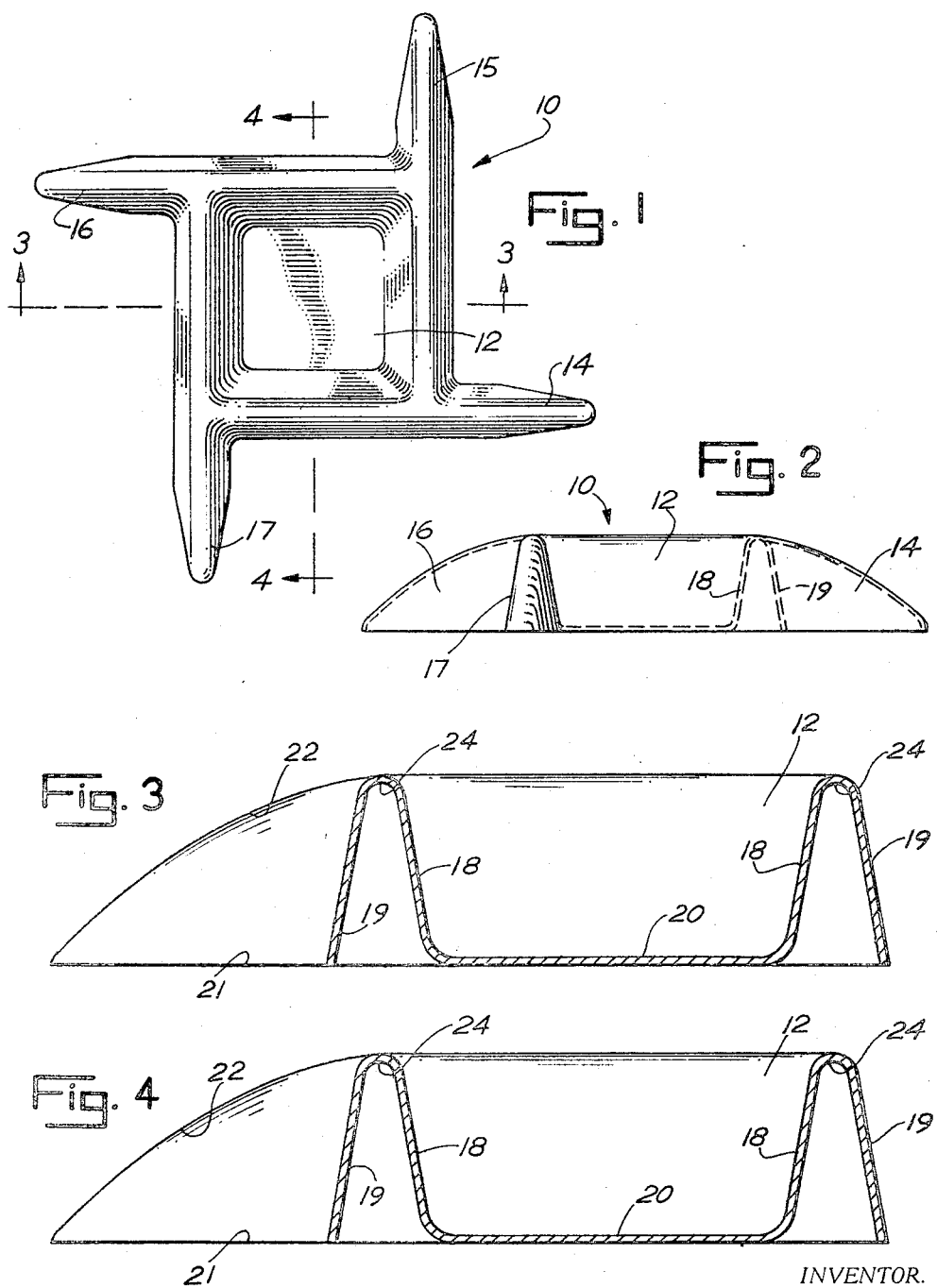

This invention relates to a watering and feeding device for animals.

Animals, particularly horses, ponies, cows, cattle, sheep, pigs and some breeds of dogs and cats have a tendency to root. This appears to be a natural instinct. It is generally evidenced when the animal is feeding. If a bowl or bucket is used as the feed receptacle, such an animal invariably tips it over because of his rooting tendency.

Larger animals also have a tendency to paw or stomp. They do so while feeding to assist in grasping the particular item being eaten and probably to cause some breakage of the food item for easier intake. When a bowl or bucket is used, it eventually is smashed because of such stomping tendency.

Accordingly, an object of this invention is to provide an improved watering and feeding device for animals. In this respect, it is contemplated that the watering and feeding device be particularly adapted for use by horses and cows.

Another object is to provide a device of the above character which cannot be tipped over readily by the animals.

Still another object is to provide a device of the above character whose structure actually resists tipping and favors upright positioning.

A further object is to provide a device of the above character which is strong in structure to resist the effect of stomping by the animal using the device.

A still further object is to provide a device of the above character which can be easily fabricated of plastic.

Another object is to provide a device of the above character which can be stacked one on top of the other.

Other objects of the invention will in part be obvious and will in part appear hereinafter.

The above objectives are accomplished with the watering and feeding device of the present invention which includes, generally, a central bowl which is polygonal in shape, preferably square-shaped, with legs that extend outwardly from its sides, at each of its corners. As indicated above, the device can be fabricated of wood, metal or other types of material, but is preferably fabricated of plastic. The dimensions of the legs are proportioned to provide sufficient stability to prevent the watering and feeding device from being readily spilled, or tipped over.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawing in which:

FIG. 1 is a top plan view of the watering and feeding device of the present invention;

FIG. 2 is a side plan view of the watering and feeding device of FIG. 1; and

FIGS. 3 and 4 are sectional views, taken along lines 3—3 and lines 4—4 of FIG. 1, respectively.

Similar reference characters refer to similar parts throughout the several views of the drawing.

Referring now to the drawing, there is illustrated a watering and feeding device 10 having a central bowl 12 which is polygonal in shape, with legs 14–17 extending outwardly from its sides, at each of its corners. As can be best seen in FIGS. 3 and 4, the bowl 12 is preferably square-shaped, having inner and outer side walls 18 and 19, respectively, which are joined at their top ends by a crown radius 24. The inner and outer side walls 18 and 19 also are spaced from one another and angularly disposed so as to be spaced further apart at their bottom edges than at top, to provide a larger base area and, therefore, greater stability. The bottom wall 20 of the bowl 12 is flat and is horizontally aligned in the same plane with the edge of the outer side wall 19.

The legs 14 and 16 each extend horizontally and outwardly in opposite directions, from the diagonally opposed corners of the bowl 12, while the legs 15 and 17 extend in opposite directions from respective ones of the other two diagonally opposed corners thereof. The legs 14–17 each constitute extensions of the inner and outer side walls 18 and 19, and the top sides or edges 22 thereof are correspondingly formed with a crown radius and are further curved downwardly from the edge of the bowl 12 to their ends. The underside or bottoms 21 of each of the legs 14–17 are flat, and are disposed in horizontal alignment in the same plane with the bottom 20 of the bowl 12. When arranged in this fashion, the legs 14–17 effectively enlarge the base area of the device 10 so as to provide additional stability, to prevent it from being spilled or tipped over by an animal when watering or feeding from it. The crown radius and the curvature of each of the legs 14–17 also provide a smooth flowing contour which is less susceptible to being engaged by an animal and therefore further tends to lessen the possibility of the device being tipped over by an animal.

The watering and feeding device 10 can be fabricated of wood, metal, plastic or any other material which is sufficiently strong to prevent it from being destroyed or broken when stepped on by an animal, particularly a horse or a cow. Preferably, however, it is fabricated from a single sheet or piece of plastic such as by vacuum forming it, by rotational molding it or by injection molding it. It can be seen that its design readily lends itself to such fabrication, and accordingly, the device can be fabricated easily, quickly, and relatively inexpensively. Plastics such as ethyl cellulose, polyvinyl chloride, polyethylene, polypropylene, the epoxys, polyacetal, acrylonitrile-butyrate-styrene, and the like are typical of the plastic which may be used.

It might be noted that the particular manner in which a leg, 14, 15, 16 or 17 extends with respect to its adjoining two sides is critical. It must be an extension of one side and be in alignment therewith. If the leg is angled, or if two legs in place of one are used, the anti-tipping feature is lost.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

Now that the invention has been described, what is claimed as new and desired to be secured by Letters Patent is:

1. A watering and feeding device for animals comprising a central bowl which is polygonal in shape and having a leg extending in a horizontal outwardly continuation of one side, at each of the corners of said polygonal shape, said leg being in alignment with said side.

2. The watering and feeding device of claim 1 wherein said central bowl is square-shaped.

3. The watering and feeding device of claim 1 wherein said central bowl has inner and outer walls which are affixed to one another at the top edges thereof in a fashion such as to form a radius, said inner and outer walls being spaced apart and angularly disposed so as to be further apart at the bottom than at the top.

4. The watering and feeding device of claim 3 wherein said legs each constitute an extension of said inner and outer walls along one side of said central bowl.

5. The watering and feeding device of claim 1 being fabricated of plastic.

References Cited

UNITED STATES PATENTS

| 2,600,103 | 6/1952 | Feck | 119—77 |
| 2,742,877 | 4/1956 | Stoner | 119—61 |
| 2,789,537 | 4/1957 | Bailey | 119—61 |
| 3,121,418 | 2/1964 | Stone | 119—61 |
| 3,147,739 | 9/1964 | Shaheen | 119—51.5 |
| 3,205,860 | 9/1965 | Moore | 119—52 |
| 3,241,524 | 3/1966 | Torson | 119—51 |
| 3,324,833 | 6/1967 | Clugston | 119—61 |

ALDRICH F. MEDBERY, *Primary Examiner.*